US009767522B2

(12) United States Patent
Kuenzler

(10) Patent No.: US 9,767,522 B2
(45) Date of Patent: Sep. 19, 2017

(54) SYSTEM AND METHOD FOR MONITORING USE OF A LAMP

(71) Applicant: GE Lighting Solutions, LLC, East Cleveland, OH (US)

(72) Inventor: Glenn Howard Kuenzler, East Cleveland, OH (US)

(73) Assignee: GE LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 13/706,511

(22) Filed: Dec. 6, 2012

(65) Prior Publication Data

US 2014/0164195 A1 Jun. 12, 2014

(51) Int. Cl.

| | |
|---|---|
| ***G07F 19/00*** | (2006.01) |
| ***G06Q 50/06*** | (2012.01) |
| ***G06Q 30/04*** | (2012.01) |
| ***H05B 37/02*** | (2006.01) |
| *G06F 19/00* | (2011.01) |

(52) U.S. Cl.
CPC ............. *G06Q 50/06* (2013.01); *G06Q 30/04* (2013.01); *H05B 37/02* (2013.01)

(58) Field of Classification Search
USPC ........................................................... 705/34
See application file for complete search history.

(56) References Cited

U.S. PATENT DOCUMENTS 5,075,978 A * 12/1991 Crowe ..................... G01C 9/32 33/348.2
7,962,299 B2 * 6/2011 Robertson .............. G01R 11/56 702/62
8,732,031 B2 5/2014 Martin et al.
2010/0174419 A1 7/2010 Brumfield et al.
2010/0190107 A1 7/2010 Shibata et al.
(Continued)

FOREIGN PATENT DOCUMENTS

CN 101035218 A 9/2007
CN 201425751 Y 3/2010
(Continued)

OTHER PUBLICATIONS

Charley, "Android@Home The Smart Device Mesh", available on http://controlissblinds.co.uk/news/homeautomation/androidhomethesmartdevicemesh" ,2011, retrieved on Jun. 23, 2015.

(Continued)

*Primary Examiner* — Garcia Ade
(74) *Attorney, Agent, or Firm* — GE Global Patent Operation; Peter T. DiMauro

(57) ABSTRACT

Systems and methods for monitoring and tracking usage of a lamp and, in one example, assigning a monetary value that can be billed to an end user are provided. Examples of the lamps can communicate wirelessly in order to receive and to transmit information related to initialization, authorization, electrical power consumption monitoring, and combinations thereof. In one embodiment, the lamp transmits data a usage parameter to a service provider via a network. The service provider can aggregate the data and, in one example, assign a usage fee that describes a monetary value based on the usage parameter and generate an output that includes that usage fee.

21 Claims, 8 Drawing Sheets

(56) References Cited

U.S. PATENT DOCUMENTS

| | | | | |
|---|---|---|---|---|
| 2010/0191107 | A1* | 7/2010 | Bowers ................ | A61B 5/0091 600/436 |
| 2010/0262297 | A1 | 10/2010 | Shloush et al. | |
| 2011/0028809 | A1 | 2/2011 | Goodman | |
| 2011/0055116 | A1 | 3/2011 | Wang | |
| 2011/0101956 | A1 | 5/2011 | Thorn | |
| 2012/0041696 | A1 | 2/2012 | Sanderford et al. | |

FOREIGN PATENT DOCUMENTS

| | | | |
|---|---|---|---|
| CN | 101873009 | A | 10/2010 |
| TW | 200803627 | A | 1/2008 |
| TW | 201239560 | A1 | 10/2012 |

OTHER PUBLICATIONS

Greenwavereality, "Intelligent Lighting Video—NXP and GreenWave Reality", available on http://www.youtube.com/watch?v=ZCeMp3Bk5Sc&feature=player_embedded, since May 14, 2011, retrieved on Jun. 24, 2015.

Fakharuddin et al., "Advance Control and Monitoring of Daily Electricity Consumption Using a Smart Energy Detective", Advances in Computing, Control and Telecommunication Technologies (Act), 2010 Second International Conference On, IEEE, pp. 118-121, Dec. 2, 2010.

Kulkarni et al., "A Review of Electricity Monitoring and Feedback Systems", Southeastcon, 2011 Proceedings Of IEEE, IEEE, pp. 321-326, Mar. 17, 2011.

A PCT Search Report and Written Opinion issued in connection with corresponding Application No. PCT/US2013/069028 on Jul. 15, 2014

Unofficial English translation of Chinese Office Action issued in connection with corresponding CN Application No. 201380072423.8 on May 20, 2016.

Unofticial English Translation of Taiwan Office Action issued in connection with corresponding TW Application No. 102143590 on Mar. 1, 2017.

* cited by examiner

SYSTEM AND METHOD FOR MONITORING USE OF A LAMP

BACKGROUND

Technical Field

The subject matter of the present disclosure relates to lamps and other lighting devices, and in one particular aspect, to systems and methods that monitor operation of lamps in order to assign a monetary value to bill to end users and consumers.

Description of Related Art

Despite advances in energy efficient lamps and lighting devices and concerns with the impact of unfettered energy consumption on the environment, consumers often fail to embrace more energy efficient products. Consequently, over the past half century, the government of the United States of America has initiated several programs aimed at encouraging individuals and companies to utilize more energy efficient products, wherein such governmental programs included Demand Side Measures and the Green Lights Initiative. Demand Side Measures benefitted end users by means of a series of potential available rebates applicable to the purchase of energy efficient lighting systems and other energy efficient systems, pieces of equipment, and appliances, wherein such rebates to the end users were funded often by utility companies and power suppliers. One of the primary objectives of the Green Lights Initiative was to encourage corporations and other commercial establishments to retrofit their facilities and their offices with energy efficient lighting systems and to install energy efficient lighting systems during construction of new facilities and offices.

While solid-state lighting technologies, e.g., light-emitting diodes (LED) devices, often have superior performance to incandescent lamps with respect to useful lifetime (e.g. its lumen maintenance and its reliability over time) and higher electrical efficiency (e.g. Lumens per Electrical Watt (LPW)), the majority of households and commercial establishments continue to use incandescent lamps. The lifetime of incandescent lamps is typically in the range about 1,000 to 5,000 hours as opposed to the lifetime of solid-state lighting devices, which often exceeds 25,000 hours. The electrical efficiency for an incandescent or halogen lamp is typically in the range of 10-30 LPW, whereas the electrical efficiency of solid-state lighting devices is currently in the range of 40-100 LPW or higher.

Unfortunately, solid-state lighting devices are more costly to manufacture than incandescent lamps. These costs pass to the consumer in the form of initial purchase prices for solid-state lighting devices that are greater than the initial purchase price of an incandescent lamp. The higher purchase prices often drive consumers away from solid-state lighting devices, even though the total expense to the consumer over the lifetime of the solid-state lighting device is less than the total expense to the consumer over the lifetime of an incandescent lamp.

It is desirable, therefore, to encourage households and businesses to convert to and to install more energy efficient lamps. Thus, there is a need for systems and methods that promote use of these energy efficient lamps without the barrier of initial purchase price, while also allowing manufacturers and service providers (e.g., utilities) to recoup the cost to manufacture and/or to distribute the energy efficient lamps.

BRIEF DESCRIPTION OF THE INVENTION

The present disclosure describes, in one embodiment, a device for monitoring use of a lamp. The device comprises a processor, a memory coupled with the processor, and a set of executable instructions stored in the memory and configured to be executed by the processor. The executable instruction comprise instructions for receiving a signal containing data that defines a usage parameter for the lamp, calculating a lamp usage fee that relates the usage parameter to a first monetary value, and generating an output comprising the lamp usage fee.

The present disclosure also describes, in one embodiment, a system that comprises a lamp comprising a light source and a monitoring device for monitoring use of the lamp. The monitoring device comprises a processor, a memory coupled with the processor, and a set of executable instructions stored in the memory and configured to be executed by the processor. The executable instructions comprise instructions for receiving a first signal containing an identification code for the lamp and transmitting a second signal in response to the first signal. The second signal contains an authorization code, wherein the lamp changes from a first operating condition to a second operating condition in response to the authorization code, and wherein the lamp generates light in the second operating condition. The executable instructions also comprise instructions for receiving a third signal containing data that defines a usage parameter for the lamp in the second operating condition, calculating a lamp usage fee that relates the usage parameter to a first monetary value, and generating an output comprising the lamp usage fee.

The present disclosure further describes, in one embodiment, a method for monitoring use of a lamp. The method comprises steps for receiving a signal containing data that defines a usage parameter for the lamp, calculating a lamp usage fee that relates the usage parameter to a first monetary value, and generating an output comprising the lamp usage fee.

Other features and advantages of the disclosure will be apparent to persons skilled in the art by reference to the following detailed description in combination with the accompanying figures.

BRIEF DESCRIPTION OF THE DRAWINGS

Reference is now made briefly to the accompanying drawings, in which.

Where applicable, like reference characters designate identical or corresponding components and units throughout the several views, which are not to scale unless otherwise indicated.

DETAILED DESCRIPTION OF THE INVENTION

The present disclosure describes systems and methods to monitor use of lamps such as lamps found in households and office buildings. The proposed improvements can aggregate data from the lamps and, in one example, use the data to calculate a lamp usage fee, which assigns a monetary value to quantify the use of the lamp. This monetary value is billed to an end user. As set forth in more detail below, this feature can help defer the cost of energy-efficient lamps, which are often more expensive than conventional incandescent lamps. For example, one or more embodiments of the present disclosure implement the lamp usage fee to represent the monetary value of both the use of the lamp (e.g., in a dollar amount for electrical power consumption and/or a dollar amount for the time the lamp is operational) as well as the cost of manufacturer of the lamp in lieu of up-front costs to the end user to purchase the lamp. In this way, the systems and methods change conventional cost and billing paradigms and, in one aspect, encourage end users to more readily convert to energy-efficient lamps by removing initial cost barriers and, in one example, spreading the costs over time.

Figure 1:
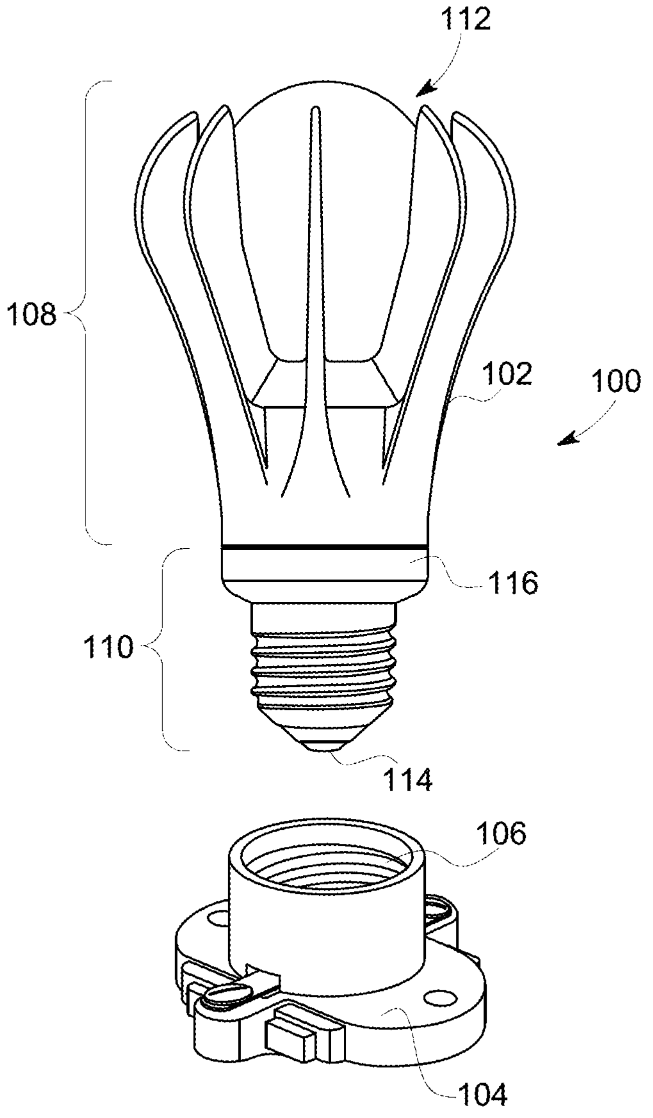
FIG. 1 depicts an exemplary system that includes a lamp and a lighting device that can receive and energize the lamp.

FIG. 1 shows an exemplary system 100 that includes a lamp 102 and a lighting device 104 (e.g., a light fixture) with a receiving socket 106. The lighting device 104 can connect with and/or include a source of standard electrical power (e.g., 110 V and/or 220 V AC and/or 12 VDC and/or DC batteries). This power source can energize the lamp 102 to generate light. Examples of the lamp 102 may include an illumination section 108 and a base assembly 110. The illumination section 108 houses a light source 112 (e.g., an incandescent light source, a halogen light source, and/or an LED light source). The base assembly 110 has a terminal end with an electrical connector 114 that can mate with the receiving socket 106 of the lighting device 104. In one example, the lamp 102 can include a signal indicator 116, which is disposed on the exterior of the lamp 102 to provide visual indication to an end user, as discussed further below.

Examples of the base assembly 110 can include a threaded base assembly, a bayonet-type base assembly, and/or other standard base assembly that utilizes the electrical connector 114 to engage the receiving socket 106 to transmit power to energize the light source 112. The base assembly 110 and, more particularly, the electrical connector 114 may be compatible with Edison-type lamp sockets found in U.S. residential and office premises as well as other types of sockets and connectors that conduct electricity to components of the lamp 102. In one embodiment, the illumination section 108 and the base assembly 110 form a unitary package capable of operating when connected, directly or indirectly, to electrical power. The lamp 102 finds use in many different types of lighting devices 104 such as desk lamps, table lamps, decorative lamps, chandeliers, ceiling fixtures, outdoor lighting, flashlights, portable lighting devices, and other lighting apparatus.

The signal indicator 116 may signal a status by providing visual and/or audible indicators that inform the end user about the status of the lamp 102. For example, the indicators may operate to alert the end user that the lamp 102 is awaiting authorization, instructions, and/or data, e.g., from a remote device. The signal indicator 116 may comprise a light (e.g., a light-emitting diode (LED) device). In one implementation, the light may illuminate in one or more patterns to convey the status of the light source 112 to the end user. These light patterns may cause the light source 102 to remain illuminated substantially continuously, flash periodically, flash once, and/or display a series of flashes in varying series and/or orders. In another example, the signal indicator 116 may comprise an audio speaker that can emit an audible alert to the user. The audible alert may sound in one or more patterns of audible signals or tones to convey the status of the lamp 102 to the end user. These sound patterns may be in the form of a continuous tone, a sequence of tones, a single beep, a musical tune, and/or a series of beeps. This disclosure also contemplates configurations of the lamp 102 in which the signal indicator 116 is omitted from the lamp 102. For example, in one implementation, the light source 112 itself is used to indicate the status and/or operating condition of the lamp 102 to the end user in lieu of a separate light or an audio speaker as discussed above. In one example, the light source 112 may flash once, periodically, or continuously in order to notify the user that the lamp receiver 122 is waiting to receive or is receiving a signal. In still another example, the light source 112 may change characteristics of the light (e.g., brightness, color, contrast, etc.) to convey the status of the lamp to the user.

Figure 2:
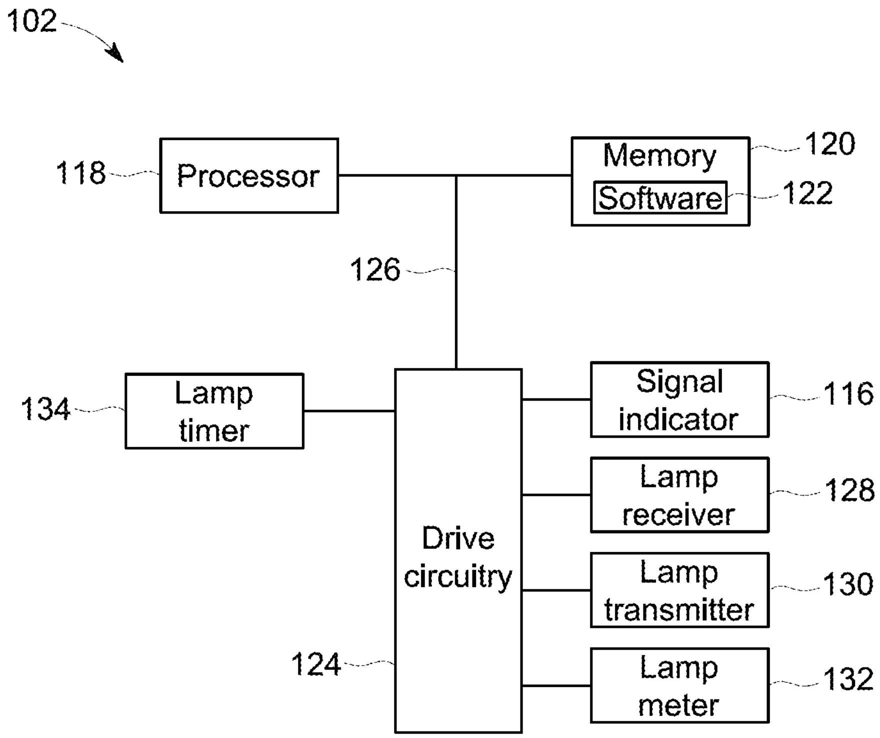
FIG. 2 depicts an exemplary schematic diagram of electrical circuitry for the lamp of FIG. 1.

FIG. 2 illustrates a schematic diagram of a high-level wiring schematic for the lamp 102 to further describe some of the features and components disposed therein. In one embodiment, the lamp 102 includes a processing device that comprises a processor 118, a memory 120 in which software 122 is stored or is installed, and drive circuitry 124, coupled together with one or more busses 126. In one embodiment, the drive circuitry 124 couples with various components, e.g., the signal indicator 116, a lamp receiver 128, a lamp transmitter 130, a lamp meter 132, and a lamp timer 134.

The lamp receiver 128 and the lamp transmitter 130 may include components that can be housed in the interior of the base assembly 110 (FIG. 1) and/or located on the exterior of the base assembly 110 (FIG. 1). Although described as separate components, the lamp receiver 128 and the lamp transmitter 130 can form a single unit (e.g., a radio that can transmit and receive signals) or can be integrated into a single electronic component or microchip. Broadly, the lamp receiver 128 and the lamp transmitter 130 facilitate communication between the lamp 102 and devices located remote from the lamp 102 (e.g., a wireless router or network). This communication can occur using any one of a variety of communication methods (e.g., a traditional radio-frequency (RF) transmission and Bluetooth® technology) that are useful to communicate across a wireless local area network, an ad-hoc wireless network, a cellular communication network, a satellite network, and the like.

Examples of the lamp transmitter 130 can transmit encrypted or unencrypted signals that contain data and information that relate to characteristics of the lamp 102. The transmitted data and information may relate to certain operating characteristics, parameters, and other features of the lamp 102. In one example, the transmitted data and information may include an identification code that is unique to the lamp 102, a usage parameter (e.g., an amount of electrical power used by the lamp 102 and/or an amount of time the lamp 102 has been operational), a geographic location for the lamp 102, and/or any combination thereof.

The lamp receiver 128 can receive signals that originate from devices remote from the lamp 102. These signals may include data and information that relates to operation of the lamp 102. For example, the received data and information may include an authorization code with instructions that cause the lamp 102 to change from a first operating condition to a second operating condition. When in the second operating condition, the light source 112 can generate light. In one example, the received data and information may also include a transmission acknowledgement that confirms the remote device received the identification code and/or other data and information (e.g., the usage parameter) that define operation of the lamp 102 and the light source 112.

Use of the identification code and the authorization code faciliates control over the operation of the lamp 102. In one implementation, the lamp 102 will only generate light after an exchange of the identification code and the authorization code occurs, e.g., between the lamp 102 and a remote device. This feature may require an end user to initiate the exchange of the identification code and the authorization code in order for the lamp 102 to operate, e.g., in the lighting device 104 (FIG. 1). For example, when the lamp 102 is electrically mated to the lighting device 104 (FIG. 1) and/or connects with an electrical power source and the lamp 102 is activated or turned "on," the lamp transmitter 130 can transmit the identification code in the form of a signal transmitted via a wireless communication protocol. In one example, the lamp 102 then waits for the authorization code. While the lamp 102 is waiting for the authorization code, the signal indicator 116 may alert the end user that the lamp 102 is waiting to receive the authorization code. Various functions of the lamp 102 (e.g., operation of the light source to generate light) will activate after the lamp 102 receives the authorization code and changes from the first operating condition to the second operating condition.

The lamp meter 132 and the lamp timer 134 can measure variables that are useful to determine usage and/or operation of the lamp 102. The lamp meter 132, for example, can measure an amount of electrical power used by the lamp 102. The lamp timer 134 can measure an amount of time the lamp 102 is in use (e.g., when the lamp 102 is "on" and/or "off"). Examples of the lamp meter 132 and the lamp timer 134 can comprise a variety of discrete circuits and microchips, microprocessors, and/or other suitable devices for the measurement of elapsed variable (e.g., time). In one embodiment, the usage parameter comprises one or more of the amount of electrical power used by the lamp 102 and the amount of time the lamp 102 is in use.

In one example, the lamp 102 may include more than one lamp timer 134 as part of the base assembly 110. The lamp timer 134 may include a first lamp timer to measure the amount of time the lamp 102 is used and a second lamp timer to measure the amount of time that elapses between transmission of the usage parameter, e.g., via the lamp transmitter 130. In an alternate embodiment, the lamp timer 128 may measure the total amount of time the lamp 102 has been used since the lamp 102 received the authorization code as well as other measures, e.g., cumulative totals of the amount of time the lamp 102 has been in use. One or more of these measurements may be transmitted as part of the usage parameter and, ultimately, find use to calculate the lamp usage fee associated with the lamp 102.

Examples of the lamp memory 120 can comprise flash memory or other suitable memory device(s) that can store data and information thereon. The stored data and information may include the amount of electrical power required by the lamp 102 to produce multiple levels of brightness (e.g., for use with a three-way bulb having settings of 30 W/45 W/60 W or 50 W/100 W/150 W). This data and information can also include the identification code unique to the lamp 102, a time of day, a calendar date, an elapsed time interval, or any combination thereof. In one example, the usage parameter (e.g., the amount of electrical power consumed) is stored in the lamp memory 120, either permanently, until erased, for a pre-determined amount of time, or until replaced by later data related to the usage parameter. In another example, prior to the lamp 102 being shipped, distributed, or sold to the user, the identification code unique to the lamp 102 is saved in the lamp memory 120.

Figure 4:
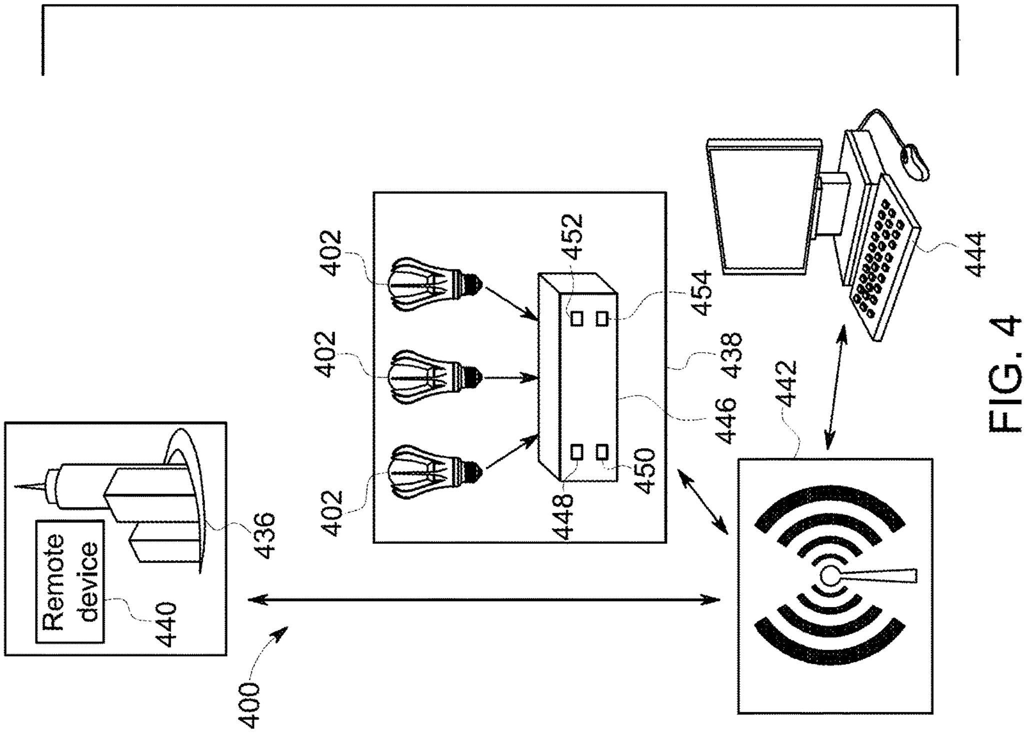
FIG. 4 depicts a schematic diagram of another exemplary embodiment of a system for monitoring use of a plurality of lamps, e.g., the lamps of FIGS. 1 and 2.
Figure 3:
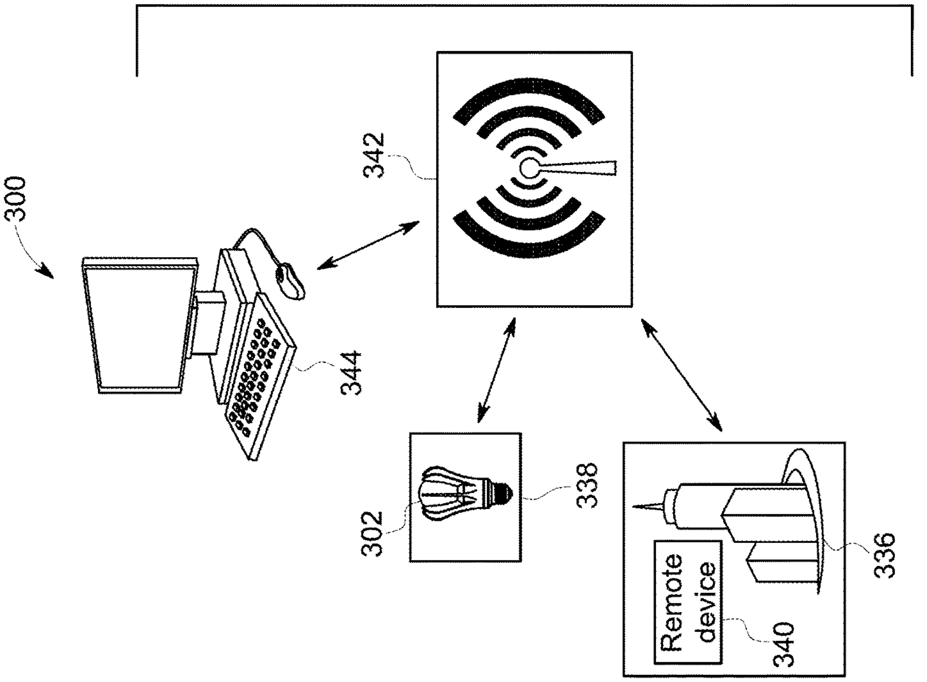
FIG. 3 depicts a schematic diagram of an exemplary embodiment of a system for monitoring use of a lamp, e.g., the lamp of FIGS. 1 and 2.

FIGS. 3 and 4 illustrate schematic diagrams of an exemplary system 300 (FIG. 3) and an exemplary system 400 (FIG. 4) for monitoring usage of, respectively, a lamp 302 and one or more lamps 402 at a single geographical location. The systems 300, 400 are configured to calculate the lamp usage fee and, thus, assign a monetary value for use and operation of the lamp 302, 402. In this way, the lamps 302, 402 can be distributed at no cost (or low cost) to the end user. The costs of the lamps 302, 402 are, instead, recouped using the systems and execution of the methods highlighted herein to monitor use of the lamps 302, 402 and generate a bill to the end user. As set forth above, the bill can include a lamp usage fee for the lamps 302, 402 that includes, for example, a monetary value that reflects the amount of electrical power consumed by the lamps 302, 402 and/or the amount of time the lamp is in use. In one example, the bill can also include a lamp ownership fee that can define a monetary value for the costs associated with manufacture of the lamps 302, 402. This configuration, in effect, spreads the costs of the lamp 302, 402 across multiple payments, which may incentivize the end user to install the more energy efficient devices in the home or business.

In FIG. 3, the system 300 includes a service provider 336 (e.g., a utility power company, lamp manufacturer, and/or combination thereof) that distributes the lamp 302 for the end user to use at a location 338 (e.g., a home). The service provider 336 has a remote monitoring device 340, which communicates with the lamp 302 via a network 342. Examples of the network 342 can include devices that facilitate communication of components, e.g., using wireless communication protocols. The devices may be part of larger networks, e.g., radio towers, cell phone towers, satellites, routers, hubs, and other devices that facilitate the transmission and reception of signals via wireless communication as disclosed herein. The system 300 further includes a computing device 344 that can provide a graphical user interface (GUI) to allow the end user to communicate with the service provider 332 via the network 342. For example, the end user can utilize the GUI to create a user account with the service provider 336 and/or to interact with one or more of the lamp 302, the service provider 336, and the remote device 340. Examples of the computing device 344 can include computers (e.g., laptops, desktops, tablets, etc.) and mobile devices (e.g., smartphones), which can be co-located with the lamp 302 at the location 338 and/or can transit from the location 338 for remote access with one or more of the lamp 302 and the service provider 336, as desired. In one example, the lamp 302 can be activated using a mode of communication that is different than the GUI, e.g., via standard telephone, wherein the service provide 336 can provide the authorization code in response to communication via voice.

Examples of the remote monitoring device 340 can include a processor, memory, and one or more software, hardware, and/or firmware programs comprised of one or more executable instructions that are stored in the memory and configured to be executed by the processor. These executable instructions can be coded in a variety of software languages, which in turn, can perform various steps and functions as set forth herein. As shown in FIG. 3, the remote monitoring device 340 can be located at a facility owned and/or operated by or under the direction of the service provider 336. In other exemplary systems, the remote monitoring device 340 can be located at one or more intermediary locations, e.g., as part of a server network and/or cloud-computing network that is remote from the service provider 336.

During one implementation, the lamp 302 exchanges signals with the remote monitoring device 340 via the network 342. As discussed above, the signals may contain and/or embed information and data that is pertinent to the operation of the lamp 302. For example, the signals may contain an identification code and/or an authorization code unique to the lamp 302. The exchange of these signals can activate the lamp 302, e.g., by causing the lamp 302 to change from the first operating condition to a second operating condition. The signals can also include geographical information related to the location 338, chronological information (e.g., dates and times that transmissions will occur or have occurred, and the amount of time elapsed since previous signal transmission), operational characteristics of the lamp 302 (e.g., wattage), and usage parameters (e.g., the amount of electrical power consumed by the lamp 302, the amount of time the lamp 302 is on and/or off, etc.), and/or any combination thereof.

In one embodiment, the lamp 302 can also transmit a signal with a verification code to the remote device 340 in order to verify that the lamp 302 and the remote device 340 are able to communicate with each other. The lamp 302 may suspend operation (e.g., revert to the first operating condition from the second operating condition) until the lamp 302 receives a signal with a return verification code from the remote device 340. In one example, the lamp timer (e.g., the lamp timer 134 of FIG. 2) is utilized to determine when the lamp 302 exchanges the verification codes with the remote device 340. If the lamp 302 fails to receive a signal with the return verification code from the remote device 340 within a pre-determined interval of time, the lamp 302 will re-enter the first operating condition and, effectively, stop generating light until communication is restored by and between the lamp 302 and the remote device 340. This feature allows the service provider 336 to maintain control over the lamp 302, e.g., in the event that the end user is delinquent on paying bills and invoices that relate to operation of the lamp 302.

In one implementation, the end user can create a user account with the service provider 336 using the computing device 344. In one example, when the end user creates the user account with the service provider 336, the end user provides identifying information, e.g., name, address, telephone number, electronic mail address, and/or any combination thereof. In another example, when the end user creates the account with the service provider 336, the user provides billing information that includes the name of the end user's power supplier (if different from the service provider 336), address of the power supplier (if different from the service provider 336), a unique identifier of the end user's account with the power supplier (if different from the service provider 336), the end user's banking institution, the end user's bank's routing number, and/or any combination thereof. In one implementation, after the end user creates the user account with the service provider 336, the end user can enter the identification code for the lamp 302. The service provider 336 can associate the identification code with the user account. The service provider 336 can also verify that the identification code for the lamp 302 is valid. If the identification code for the lamp 302 has been associated with an active user account, the service provider 332 transmits a signal that contains the authorization code, e.g., from the remote unit 340 to the lamp 302 via the network 342. When the lamp 302 receives the authorization code, the lamp 302 can change from the first operating condition to the second operating condition, which activates the lamp 302 to generate light. In one example, during operation of the lamp 302, the service provider 336 receives, e.g., at the remote monitoring device 340 via the network 342, one or more signals that contain the usage parameter that defines operation of the lamp 302, e.g., electrical power consumption by the lamp 302. The service provider 336 can thereafter calculate the lamp usage fee based on the lamp usage data and/or associate data of the usage parameter with the end user's account and, effectively, generate billing information to assign a monetary value for the use of the lamp 302. This monetary value may, in one example, be transmitted to the end user in the form of a bill or an invoice.

In one example, the service provider 336 may operate a wireless communication network (e.g., a cellular telephone, pager, satellite, and/or Internet network) that allows the lamp 302 to exchange signals with the service provider 336. This network may include the network 342. In another example, the service provider 336 provides a wireless local area network, a high-speed Internet network, and/or operates an array of towers utilizing radio frequency transmission to facilitate communication and sharing of information between one or more of the lamp 302 and the service provider 336.

Referring now to FIG. 4, embodiments of the system 400 can monitor the amount of electrical power used by more than one lamp 402 (e.g., a plurality of lamps found throughout a home and/or an office building). In one embodiment, the system 400 includes a central hub 446 that resides in the location 438 to communicate with the lamps 402. The central hub 446 has a hub timer 448, a hub memory 450, a hub transmitter 452, a hub receiver 454, and/or a combination receiver/transmitter components. The central hub 446 can also include a processor and executable instruction in the form of software and firmware programs, the execution of which initiate certain operations at the central hub 446.

Broadly, the central hub 446 can aggregate information and data for the lamps 402 at a single location. The central hub 446 can then transmit this information and data to the service provider 436 through the exchange of signals via the network 442. This configuration can simplify communication and monitoring of the lamps 402 throughout homes and offices where many of the lamps may be in operation. The exchange of signals between the central hub 446 and the service provider 436 via the network 442 may constitute the exchange of identification codes, authorization codes, and usage parameters to facilitate appropriate billing for the use and operation of the lamps 402. In one example, and as discussed herein, the end user may utilize one or more of the computing device 444 to generate an user account and/or communicate with the central hum 446, the service provider 436, the remote device 440, and the lamps 402.

Figure 5:
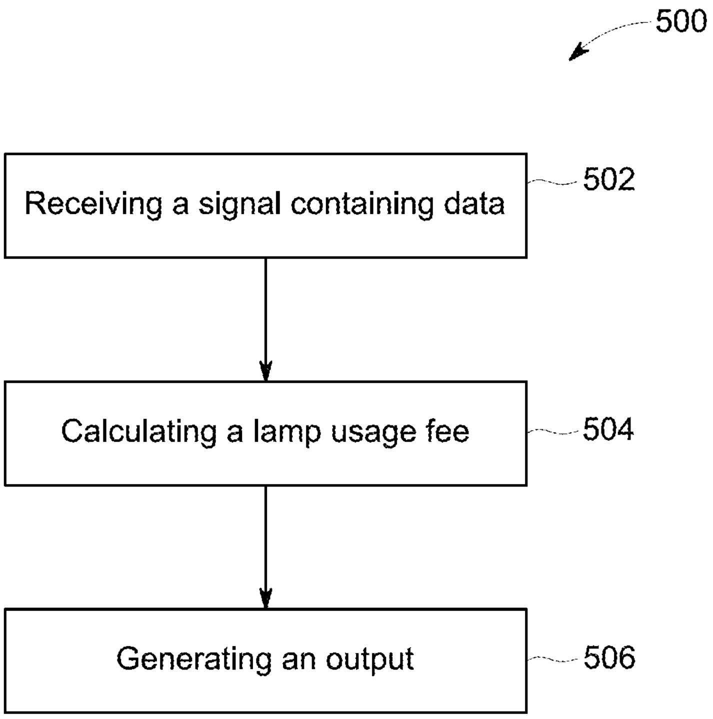
FIG. 5 depicts a flow diagram of an exemplary method for monitoring use of a lamp to generate an output to an end user.

With reference now to FIGS. 5, 6, 7, 8, and 9, the following discussion focuses on one or more methods and/or implementation techniques to utilize systems (e.g., systems 300 and 400 of FIGS. 3 and 4) to monitor operation of lamps (e.g., lamps 102, 302, and 402 of FIGS. 1, 2, 3, and 4). FIG. 5 depicts a flow diagram of an exemplary method 500 that includes, at block 502, receiving a signal containing data that defines a usage parameter for the lamp. The method also includes, at block 504, calculating a lamp usage fee that relates the usage parameter to a first monetary value. The method 500 further includes, at block 506, generating an output comprising the lamp usage fee. The output can comprise one or more forms of communication (e.g., an electronic message, a text message, and/or instructions to generated printed mailing for delivery to the user). These types of communications can, permit the service provider to bill the user directly for use of the lamp.

Figure 6:
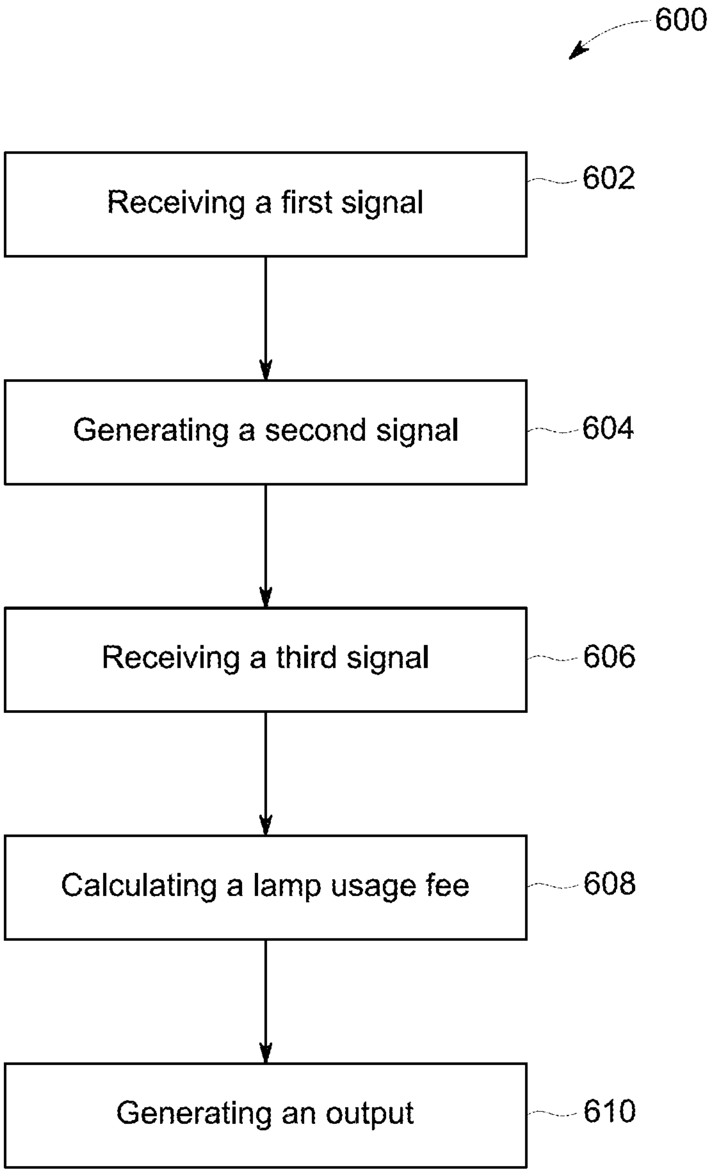
FIG. 6 depicts a flow diagram of another exemplary method for monitoring use of a lamp to generate an output to an end user that includes the exchange of signals to activate the lamp.

In FIG. 6, the method 600 includes, at block 602, receiving a first signal containing an identification code for the lamp, and at block 604, transmitting a second signal in response to the first signal, the second signal including an authorization code. In one example, the lamp changes from a first operating condition to a second operating condition in response to the authorization code. The method 600 also includes, at block 606, receiving a third signal containing data that defines a usage parameter, which as discussed above can include data about the amount of electrical power the lamp consumes and/or the amount of time the lamp is in use in the second operating condition. The method 600 further includes, at block 608, calculating a lamp usage fee that relates the usage parameter to a first monetary value and, at block 610, generating an output comprising the lamp usage fee.

Figure 7:
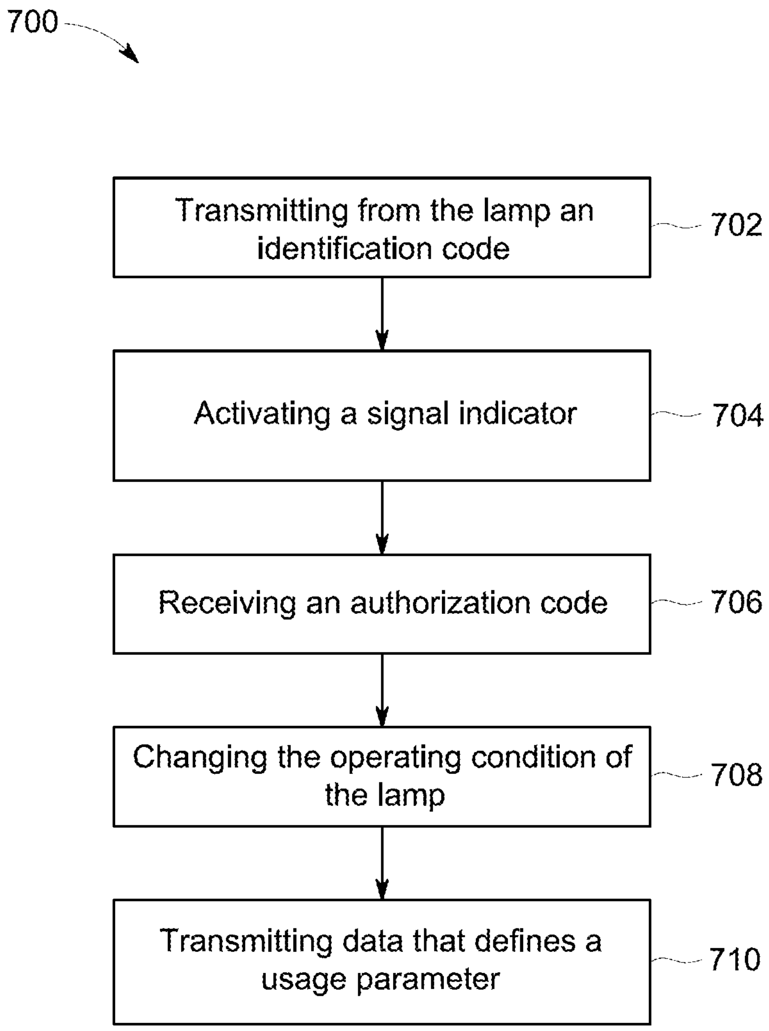
FIG. 7 depicts a flow diagram of an exemplary method of conveying data from a lamp.

FIG. 7 illustrates a flow diagram for the method 700 includes, at block 702, transmitting an identification code. In one example, the identification code includes an identification number (e.g., a serial number) that is unique to the lamp. The method of 700 further includes, at block 704, activating a signal indicator to alert the end user to the operating condition of the lamp (e.g., waiting to receive the authorization code from the service provider). The method 700 further includes, at block 706, receiving an authorization code. The method 700 also includes, at block 708, changing the operating condition of the lamp in response to the authorization code, e.g. by activating select functions that allow the lamp to generate light. In one embodiment, the method 700 may also include steps for turning the signal indicator off and/or changing operation of the signal indicator to alert the end user to the change in operating condition of the lamp. The method 700 further includes, at block 710, transmitting a signal containing data that defines the usage parameter. In one example, the transmissions of data may occur at regular time intervals such as daily or monthly. In another example, the lamp transmits usage data after each time that the lamp is in use, e.g., that the lamp is energized. In yet another example, the lamp transmits signals on the same day of each month (e.g. the $1^{st}$ or the $15^{th}$ of each calendar month).

Figure 8:
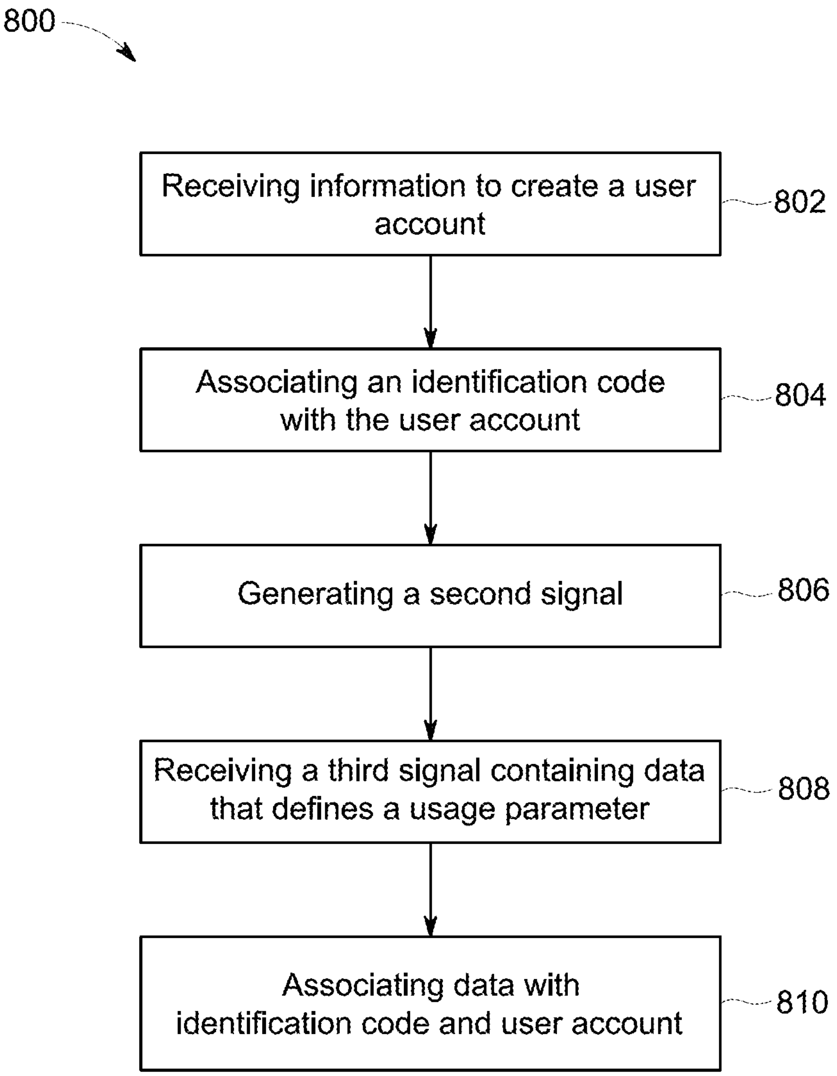
FIG. 8 depicts a flow diagram of an exemplary method for coordinating usage of a lamp and related information with a user account.

FIG. 8 depicts a flow diagram of a method 800 for monitoring and managing use of a lamp. The method 800 includes, at block 802, receiving information to create a user account and, at block 804, associating an identification code for a lamp with the user account. In one embodiment, the method 800 includes, at block 806, generating a signal containing an authorization code that, in one example, allows the lamp to enter into an operating state wherein the lamp illuminates when energized. The method 800 may further includes, at block 808, receiving a third signal containing data that defines a usage parameter and, at block 810, associating the usage parameter with the user account and/or with the identification code. Embodiments of the method 800 may also include a step of verifying that the identification code reflects an active lamp, e.g., that the lamp has updated software and/or firmware. As discussed herein, the method 800 can also include one or more steps to calculate a lamp usage fee that quantifies the usage parameter as a monetary value that can be billed to the end user for use of the lamp and, also, one or more steps to generate an output that comprises the lamp usage fee.

Figure 9:
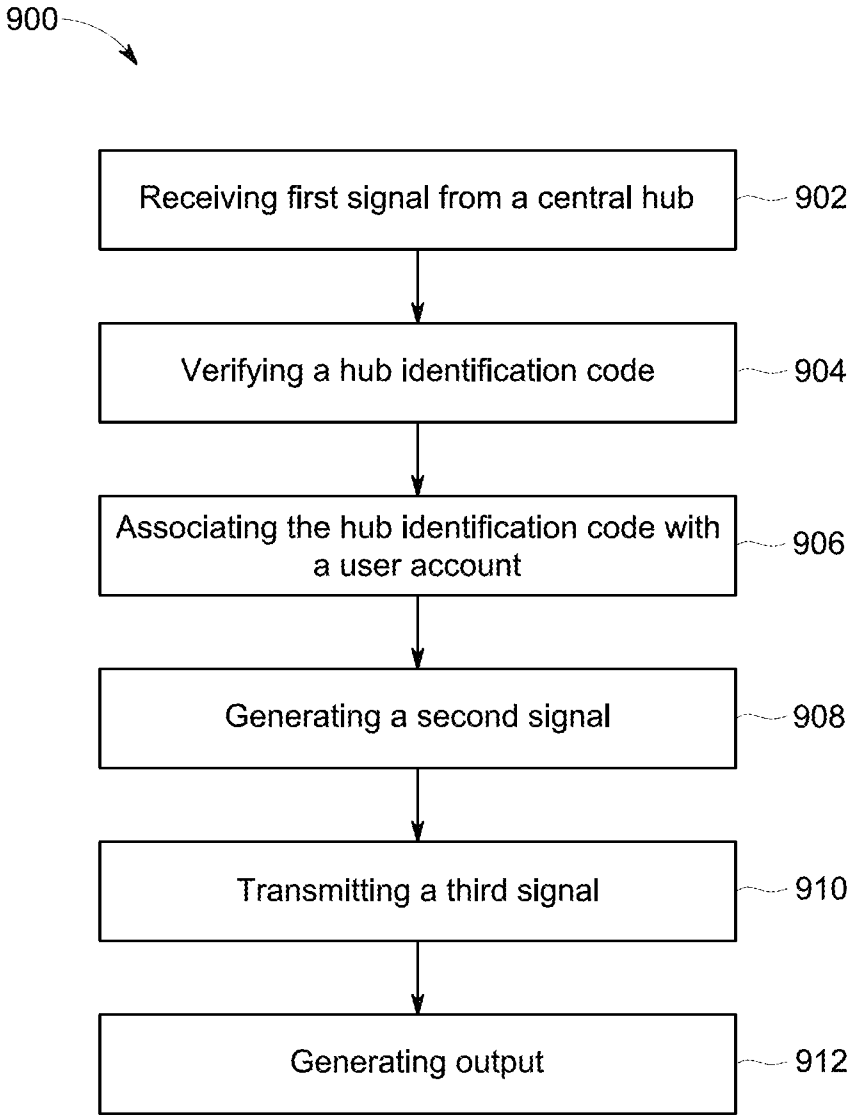
FIG. 9 depicts a flow diagram of yet another exemplary method for monitoring use of a plurality of lamps using a central hub that communicates with the plurality of lamps.

FIG. 9 illustrates another flow diagram for a method 900 for monitoring the amount of electrical power consumed by one or more lamps. The method 900 includes, at block 902, receiving a first signal containing a hub identification code unique to a central hub. The method 900 also includes, at block 904, verifying the hub identification code and, at block 906, associating the hub identification code with a user account. The method 900 further includes, at block 908, generating a second signal containing an authorization code, which may define information that the central hub uses to activate one or more lamps. In one example the method 900 further includes, at block 910, receiving a third signal with data that defines a usage parameter for one or more lamps that communicate with the central hub. The method 900 also includes, at block 912, generating an output, wherein the output contains a lamp usage fee that describes the monetary amount the user owes for use and operation of the lamps based on the usage parameter received.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program codes embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In light of the discussion above, embodiments of the proposed system and method facilitates billing of utility customers based on a usage parameter that defines data, e.g., electrical power consumption of lamps, that can be used to calculate fees that are billed to the end user. A technical effect of the proposed configurations is to provide a new billing paradigm, which can help defer the cost of the lamps while allowing consumers to benefit from the energy savings associated with certain lamp technology.

As used herein, an element or function recited in the singular and proceeded with the word "a" or "an" should be understood as not excluding a plurality of the elements or functions, unless such exclusion is explicitly recited. Additionally, the word "number" or "code" should be understood as being limited to sequences of ordinal number and not as excluding sequences of alpha-numerics or binary code. The term "user" should be understood as not excluding organizations, companies, institutions or other groups or entities and not being limited to individual or natural persons. Furthermore, references to "one embodiment" or "one implementation" of the claimed invention should not be interpreted as excluding the existence of additional embodiments and implementations that also incorporate the recited features.

This written description uses examples to disclose embodiments of the invention, including the best mode, and also to enable a person of ordinary skill in the art to practice the invention, without making and using any devices or systems and performing any incorporated methods. The patentable scope of the invention is defined by the claims, and may include other examples that occur to a person of ordinary skill in the art. Such other examples are intended to be within the scope of the claims if they have structural elements that do not differ from the literal language of the claims, or if such examples include equivalent structural elements with insubstantial differences form the literal language of the claims.

What is claimed is:

1. A device for monitoring use of a lamp, said device comprising:

a first processor located remote from a lamp, said lamp including a second processor and a drive circuit and associated with an identification code;

a memory coupled with the first processor; and a set of executable instructions stored in the memory and configured to be executed by the first processor, the executable instruction comprising instructions for:

receiving a signal containing data that defines a usage parameter for the lamp as measured by at least one of a lamp meter or a lamp timer;

calculating a lamp usage fee that relates the usage parameter to a first monetary value;

generating an output comprising the lamp usage fee; and transmitting an authorization code to the lamp second processor via a lamp receiver, the authorization code associated with the identification code and generated based on the output and a verification that a user account associated with the identification code is not delinquent in payment for lamp usage, the authorization code triggering the lamp second processor to instruct the drive circuit to change an operating condition of the lamp from a) a suspended operating condition in which operation of said lamp is precluded to b) an activated operating condition in which operation of said lamp is available.

2. The device of claim 1, wherein the output comprises a lamp ownership fee that defines a second monetary value.

3. The device of claim 2, wherein second monetary value reflects one or more costs associated with manufacture of the lamp.

4. The device of claim 1, wherein the usage parameter comprises an amount of electrical power consumed by the lamp.

5. The device of claim 1, wherein the usage parameter comprises an amount of time that the lamp is energized.

6. The device of claim 1, wherein the lamp is available to generate light in the activated operating condition.

7. The device of claim 1, wherein the set of executable instructions comprises instructions for verifying the identification code associated with the lamp.

8. The device of claim 1, wherein the output comprises an electronic message that displays the usage fee on a display.

9. The device of claim 1, wherein the output comprises instructions to generate a printed mailing for delivery to a user.

10. A system, comprising:

a lamp comprising within the lamp a second processor, a drive circuit coupled to a lamp receiver, a lamp transmitter, and a lamp timer, and a light source, the lamp associated with an identification code; and a remote monitoring device for monitoring use of the lamp, said remote monitoring device comprising a first processor, a memory coupled with the first processor, and a set of executable instructions stored in the memory and configured to be executed by the first processor, the executable instruction comprising instructions for:

receiving, from the second processor, a first signal containing the identification code for the lamp;

transmitting, to the lamp receiver, a second signal in response to the first signal, the second signal containing an authorization code associated with the identification code and generated based on a verification that a user account associated with the identification code is not delinquent in payment for lamp usage;

the lamp second processor, triggered in response to the authorization code instructing the drive circuit to change an operating condition of the lamp from a) a suspended operating condition in which operation of said lamp is precluded to b) an activated operating condition in which operation of said lamp is available;

receiving, at the remote monitoring device via the lamp transmitter, a third signal containing data that defines a usage parameter for the lamp in the second operating condition, wherein the usage parameter describes the amount of time the lamp is generating light as measured by a lamp timer;

calculating, at the remote monitoring device, a lamp usage fee that relates the usage parameter to a first monetary value; and generating an output comprising the lamp usage fee.

11. The system of claim 10, wherein the set of executable instructions further comprises instructions for associating the identification code for the lamp with a user account.

12. The system of claim 10, wherein the output comprises a lamp ownership fee that defines a second monetary value that reflects one or more costs associated with manufacture of the lamp.

13. The system of claim 10, wherein the lamp comprises a signal indicator, and wherein the signal indicator identifies the operating condition of the lamp using at least one of a visual indicator or an audio indicator to indicate whether the operating condition of the lamp is the suspended operating condition or the activated operating condition.

14. The system of claim 10, wherein the lamp comprises a timer configured to measure an amount of time the lamp is generating light.

15. A method for monitoring use of a lamp, said method comprising:

receiving, at a remote first processor, a signal containing data that defines a usage parameter for the lamp as measured by at least one of a lamp timer or a lamp meter, said lamp including a second processor and a drive circuit and associated with an identification code;

calculating, at the remote first processor, a lamp usage fee that relates the usage parameter to a first monetary value;

generating an output comprising the lamp usage fee; and transmitting an authorization code to the lamp second processor via a lamp receiver, the authorization code associated with the identification code and generated based on the output and a verification that a user account associated with the identification code is not delinquent in payment for lamp usage, the authorization code triggering the lamp second processor to instruct the drive circuit to change an operating condition of the lamp from a) a suspended operating condition in which operation of said lamp is precluded to b) an activated operating condition in which operation of said lamp is available.

16. The method of claim 15, further comprising verifying the identification code for the lamp.

17. The method of claim 16, wherein the user account includes information identifying an end user, and wherein the information comprises information selected from a group comprising a name of the user, an address of the user, a telephone number of the end user, an electronic mailing address for the end user, a name for an electrical power supplier that provides electrical power to a location at which the lamp is located, an account number belonging to the end user for provision of electrical power to the end user by the electrical power supplier, an address for the electrical power supplier, a banking institution used by the end user, a routing number for the banking institution used by the end user, and any combination thereof.

18. A device for monitoring use of a lamp, said device comprising:

a first processor located remote from the lamp, the lamp including a second processor and a drive circuit and associated with an identification code;

a memory coupled with the first processor, and a set of executable instructions stored in the memory and configured to be executed by the first processor, the executable instruction comprising instructions for:

receiving a signal containing the identification code from the lamp;

verifying the identification code for the lamp;

transmitting an authorization code to the lamp second processor via a lamp receiver, the authorization code associated with the identification code and generated based on a verification that a user account associated with the identification code is not delinquent in payment for lamp usage, the authorization code causing the second processor to instruct the drive circuit to change an operating condition of the lamp from a) a suspended operating condition in which operation of said lamp is precluded to b) an activated operating condition in which operation of said lamp is available;

receiving a signal containing data that defines a usage parameter for the lamp as measured by at least one of a lamp timer or a lamp meter;

calculating a lamp usage fee that relates the usage parameter to a first monetary value; and generating an output comprising the lamp usage fee.

19. The device of claim 18, wherein the output comprises an electronic message that displays the usage fee on a display.

20. The device of claim 18, wherein the output comprises instructions to generate a printed mailing for delivery to a user.

21. The device of claim 18, wherein the set of executable instructions further comprises instructions for associating the identification code for the lamp with a user account.

* * * * *